United States Patent [19]
Aisaka et al.

[11] Patent Number: 5,095,541
[45] Date of Patent: Mar. 10, 1992

[54] RADIO TELEPHONE APPARATUS

[75] Inventors: Hideki Aisaka; Buntarou Sawa, both of Tokyo, Japan

[73] Assignee: Kabushiki Kaisha Toshiba, Japan

[21] Appl. No.: 702,306

[22] Filed: May 20, 1991

Related U.S. Application Data

[63] Continuation of Ser. No. 316,913, Feb. 28, 1989.

[30] Foreign Application Priority Data

Feb. 29, 1988 [JP]   Japan .................................. 63-46062

[51] Int. Cl.⁵ ................................................ H04B 1/38
[52] U.S. Cl. ...................................... 455/89; 455/127; 455/343
[58] Field of Search .................... 455/89, 90, 127, 343, 455/346-349, 345; 379/58, 61; 320/2

[56]         References Cited
    U.S. PATENT DOCUMENTS

| | | | |
|---|---|---|---|
| 4,636,741 | 1/1987 | Mitzlaff | 455/127 |
| 4,723,304 | 2/1988 | Maeda | 455/89 |
| 4,903,325 | 2/1990 | Yoshitake et al. | 455/127 |
| 4,962,543 | 10/1990 | Kuge et al. | 455/89 |
| 4,977,611 | 12/1990 | Maru | 455/127 |

Primary Examiner—Curtis Kuntz
Attorney, Agent, or Firm—Banner, Birch, McKie & Beckett

[57]            ABSTRACT

A portable telephone apparatus which is capable of being selectively connected to an adaptor unit for transmitting a radio frequency (RF) signal at a certain power level in response to a level control signal. The telephone apparatus includes an amplifier for amplifying the RF signal by a predetermined amplification factor and an antenna for radiating the amplified RF signal. An operator actuatable switch is coupled to the output of the amplifier and is selectively coupled to the antenna and the adaptor unit. A control device is coupled to the amplifier and the operator actuatable switch and is responsive to the level control signal for controlling the amplifier so that the amplification factor of the amplifier is fixed to a predetermined level when the operator actuatable switch is in a first state and to a variable level when the actuatable switch is in a second state.

14 Claims, 8 Drawing Sheets

RADIO TELEPHONE APPARATUS

This application is a continuation of application Ser. No. 316,913, filed Feb. 28, 1989, still pending.

This application is related by subject matter to copending application Ser. No. 249,817 entitled RADIO TELEPHONE APPARATUS filed on Sept. 27, 1988.

FIELD OF THE INVENTION

This invention relates to the field of radio telephone apparatus for transmitting signals over a selected radio channel and, more particularly, to an improved radio telephone apparatus which includes a portable unit and an adaptor unit.

BACKGROUND OF THE INVENTION

Mobile radio telephones are known as radio telephone apparatus and are used in vehicles such as automobiles. In an automobile telephone a dial signal and a speech signal are input at a handset unit disposed near the seat of the automobile. These signals are transmitted from a transceiver unit, installed for example, in the trunk of the automobile, to a base station through which a communication link with a remote land line telephone or a remote radio telephone is established. In such a conventional automobile radio telephone apparatus, the handset unit near the automobile seat cannot be disconnected from the transceiver unit in the trunk. Thus, a user cannot use the apparatus outside the automobile.

Figure 1:
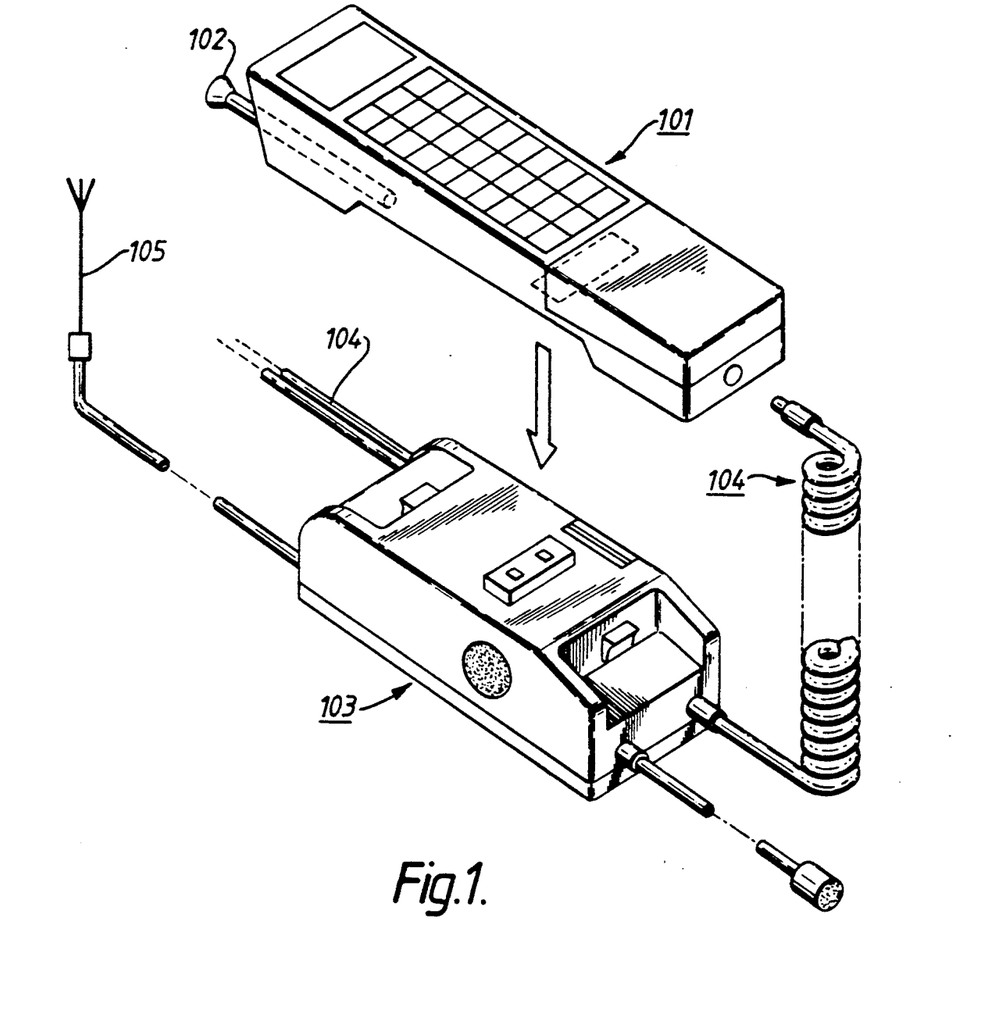
FIG. 1 is a perspective view of a radio telephone disclosed in copending application Ser. No. 249,817.

The above-noted problems associated with prior art radio telephones are addressed by the radio telephone apparatus described and claimed in application Ser. No. 249,817 mentioned above. The radio telephone described therein can be used inside or outside an automobile. FIG. 1 is a perspective view of such a radio telephone apparatus. The radio telephone apparatus comprises a portable unit 101 with an antenna 102 and an adaptor unit 103. Portable unit 101 and adaptor unit 103 are connected to each other by a coaxial cable 104. Adaptor unit 103 is supplied with power from a car battery (not shown) through a power cable 106 and is connected to an antenna 105 which is disposed outside the automobile. In accordance with the construction of the radio telephone apparatus, both portable unit 101 and adaptor unit 103 are equipped with a radio transmit/receiver circuitry. Thus, a user may communicate with another person by using portable unit 101 also or by using portable unit 101 attached to adaptor unit 103.

Figure 2:
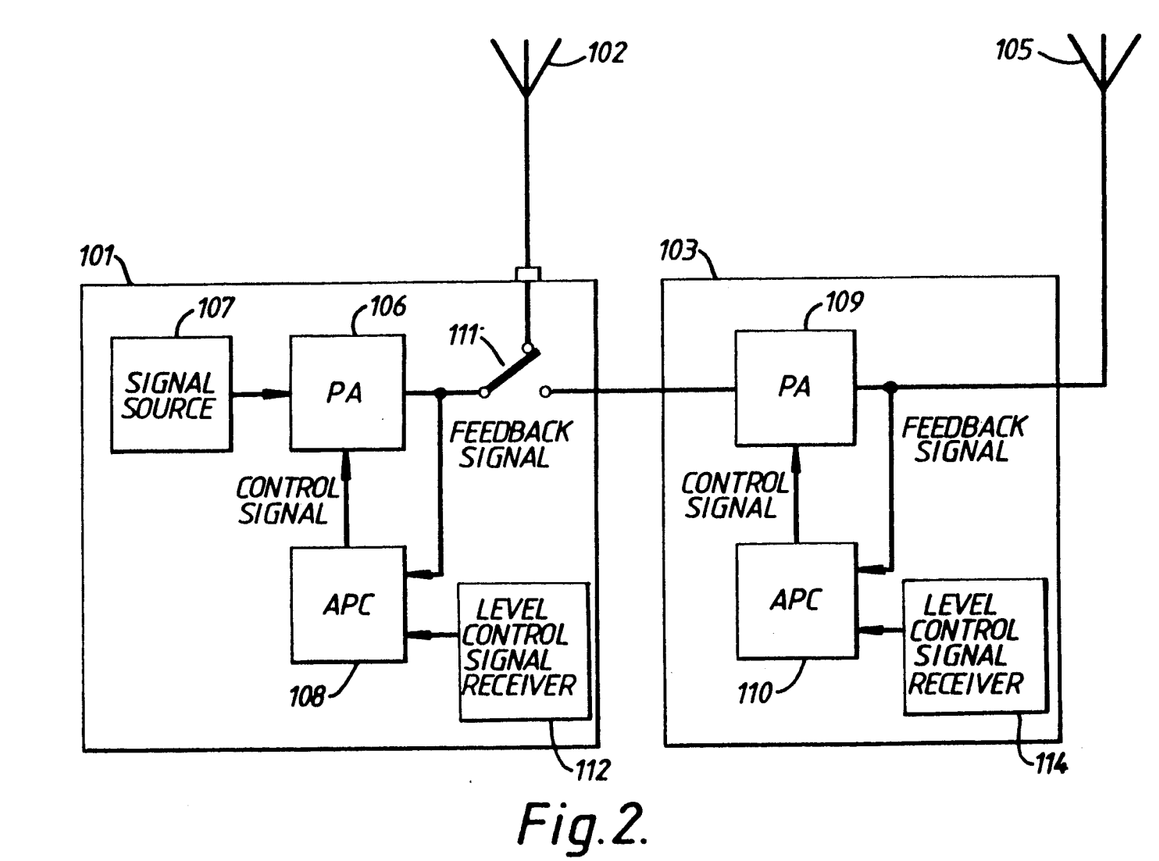
FIG. 2 is a block diagram of the radio circuitry used in the radio telephone apparatus shown in FIG. 1.

FIG. 2 is a block diagram of the radio circuitry which Applicants have found may be used in the radio telephone apparatus shown in FIG. 1. In the event that only portable unit 101 is available to the user, the output of power amplifier (PA) 106 is connected via switch 111 to antenna 102 which is provided on portable unit 101. The control and speech signals generated by signal source 107 are thus amplified by PA 106 and then transmitted via antenna 102. The amplification factor of PA 106 is determined by automatic power control circuit (APC) 108. APC 108 determines the amplification factor in response to a level control signal received by level control signal receiver 112 from a base station (not shown) and a feedback signal provided from the output of PA 106. APC 108 provide a control signal which establishes the amplification factor of PA 106.

In the event that adaptor unit 103 is available to the user along with portable unit 101, the output of PA 106 is connected to the input of power amplifier (PA) 109 via switch 111. Thus, signals generated by signal source 107 are amplified by PA 106 and PA 109 and then transmitted via antenna 105. In this configuration, APC 108 controls PA 106 in response to the level control signal and the feedback signal. Also, an automatic power control circuit (APC) 110 in adaptor unit 103 controls PA 109 in response to a level control signal received by level control signal receiver 114 from the base station (not shown) and a feedback signal provided from an output of PA 109.

Though the radio telephone apparatus illustrated in FIG. 2 represents a substantial improvement over such apparatus known in the prior art, it remains deficient in a number of respects. One such deficiency is that it is difficult to control the power level of the final amplifier stage, i.e., the output level of PA 109. This is because the input level to PA 109, i.e., the output level of PA 106, fluctuates in response to the control signal provided from APC 108.

Still, to constitute a radio telephone capable of transmitting and receiving radio frequency signals, an arrangement for receiving the signals is to be added to the above discussed radio circuitry of FIG. 2. U.S. Pat. No. 4,636,741 to Mitzlaff discloses several multi-level power amplifying circuitry for a portable radio transceiver attachable to a vehicle adaptor. Especially, FIG. 6 of the Mitzlaff patent discloses a multi-level power amplifying circuitry wherein both of the portable unit and the adaptor have a power control circuitry. According to the arrangement disclosed in the FIG. 6, since the transceiver is connected with the adaptor by plug, the transceiver becomes unavailable for handheld use and, accordingly, an additional handset is needed.

It might be considered to use cables between the transceiver and the adaptor. According to the prior art arrangement, however, to connect the transceiver with the adaptor, two cables are required, i.e., one is for transmission signals and one is for reception signals. A coaxial cable is typically available for transmitting high frequency signals. Since the coaxial cable is thicker and harder than a normal conductive lead line, if the two coaxial cables are twisted into a cable line, the cable line becomes thicker and harder much more, thereby the operability of the transceiver attached to the adaptor turns out to be worse.

SUMMARY OF THE INVENTION

It is accordingly an object of the present invention to provided a radio telephone apparatus including a portable unit and an adaptor unit attachable to the portable unit, in which the operability for the user of the apparatus is greatly improved.

It is a further object of the present invention to provide a radio telephone apparatus including a portable unit and an adaptor unit, wherein the portable unit is connected with the adaptor unit by an unique high frequency cable and wherein, in the event that the portable unit is coupled to the adaptor unit, transmission power is controlled in both of the portable unit and the adaptor unit.

In achieving these objects, as embodied and described herein, the invention includes a portable unit, an adaptor unit connectable to the portable unit through a cable, and a first antenna associate with the adaptor unit. The portable unit includes a signal source for generating transmission signals to be transmitted, a modulator connected to the signal source for modulating the transmission signals generated by the signal source, a first amplifier connected to the modulator for amplifying the transmission signals modulated by the modulator on the basis of a first amplification factor, a first automatic power control circuit (APC) for providing the first amplification factor, a second antenna for receiving and transmitting radio frequency signals, a first terminal connected to the second antenna, a second terminal connected to a connector of the portable unit, a third terminal, a first duplexer connected to the third terminal and the first amplifier for applying the transmission signals amplified by the first amplifier to the third terminal and for receiving reception signals from the third terminal and providing the reception signals to a reception terminal of the first duplexer, a receiver connected to the reception terminal of the first duplexer for receiving the reception signals from the first duplexer, and a switching circuit for selectively connecting the third terminal to either one of the first terminal or the second terminal.

The adaptor unit includes a second duplexer connected to a connector of the adaptor unit for receiving transmission signals from the connector of the adaptor unit and for applying reception signals to the connector of the adaptor unit, a second amplifier connected to the second duplexer for amplifying the transmission signals from the second duplexer on the basis of a second amplification factor, a second APC coupled to the output of the second amplifier for providing the second amplification factor in response to the output signal level of the second amplifier and a level control signal, and a third duplexer connected to the second duplexer, the first antenna, and the output of the second amplifier for applying the reception signals from the first antenna to the second duplexer and applying the transmission signals amplified by the second amplifier to the first antenna.

The cable includes a unique signal line coupled to the connectors of both of the portable unit and the adaptor unit for transmitting the transmission and reception signals.

The first APC may provide the first amplification factor in response to the output signal level of the first amplifier and a level control signal when the switching circuit connects the third terminal to the first terminal. The first APC may provide the first amplification factor which is fixed to a predetermined value when the switching circuit connects the third terminal to the second terminal. The switching circuit may connect the third terminal to the second terminal when the connector of the portable unit is connected with the connector of the adaptor unit through the cable. The switching circuit may connect the third terminal to the first terminal when the connector of the portable unit is not connected with the connector of the adaptor unit.

The portable unit may comprise a first battery. Then the portable unit may be supplied power with the first battery when the connector of the portable unit is not connected to the connector of the adaptor unit. The portable unit and the adaptor unit may be supplied power with a second battery, which output voltage is higher than that of the first battery, when the connector of the portable unit is connected to the connector of the adaptor unit through a power supply line in the cable. The first battery may be a rechargeable battery and the first battery is charged by the second battery when the connector of the portable unit is connected to the connector of the adaptor unit through the power supply line.

The problems and deficiencies of the conventional radio telephone apparatus discussed above are solved by the principles of the present invention. In this invention, transmission power is controllable at a signal path in the portable unit. The transmission signal path and a reception signal path are combined into a high frequency signal path by a first duplexer provided in the portable unit. The high frequency signal coupling between the portable unit and the adaptor unit are made by the unique high frequency signal path. The high frequency signal path is divided to a transmission signal path and a reception signal path by a second duplexer in the adaptor unit. In response to both of the output signal level of the second amplifier and a level control signal, transmission power is controllable at a transmission signal path in the adaptor unit, too. Still, the transmission signal path and the reception signal path are again combined into a high frequency signal path by a third duplexer provided in the adaptor unit and thereby only one antenna is necessary for transmitting and receiving radio frequency signals.

DETAILED DESCRIPTION OF THE PREFERRED EMBODIMENT

A preferred embodiment of the present invention will be described with reference to the accompanying drawings.

Figure 3:
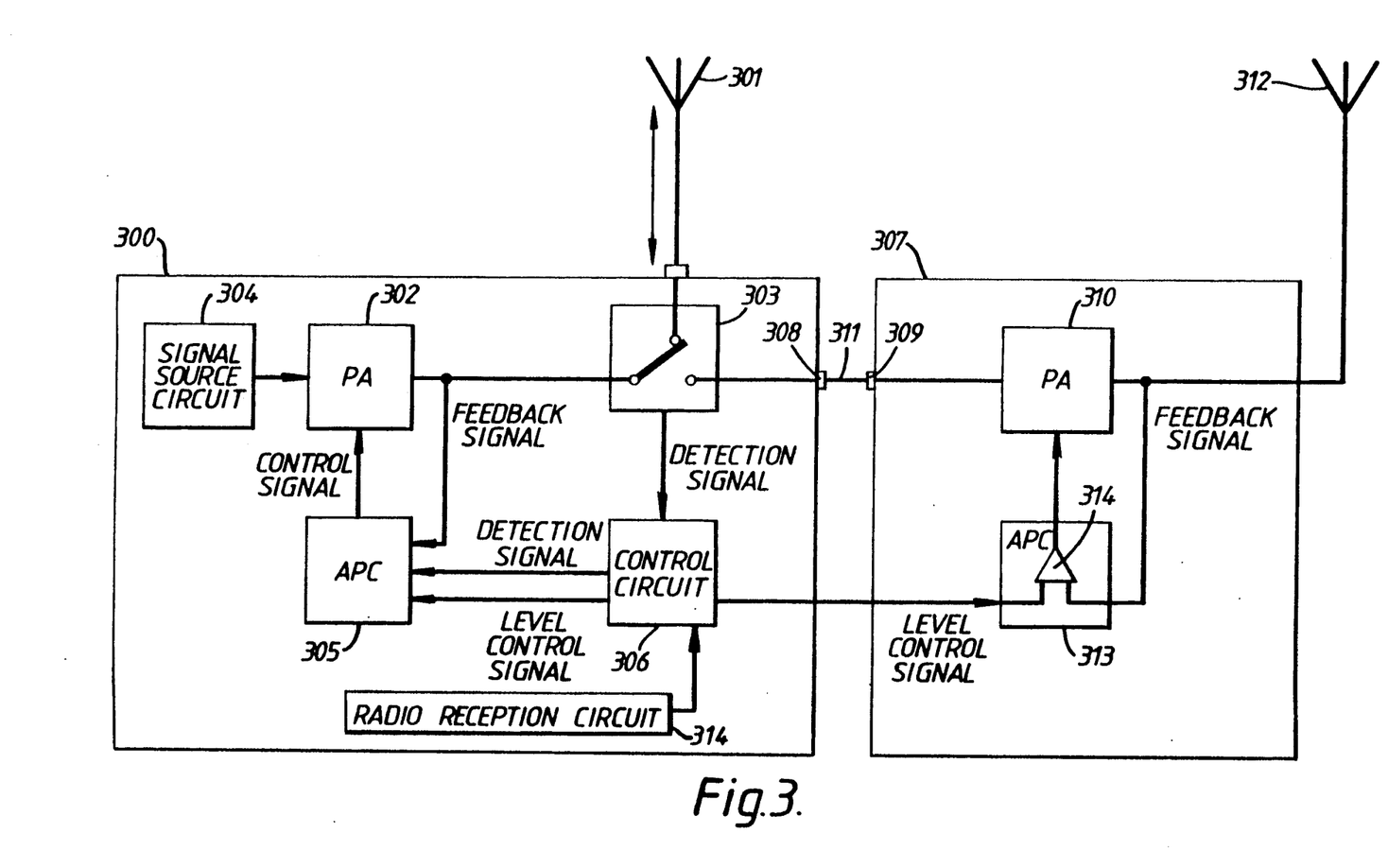
FIG. 3 is a schematic block diagram of a radio transmission circuit used in a radio telephone apparatus in accordance with an embodiment of the present invention.

FIG. 3 is a block diagram of a radio transmission circuit used in a radio telephone apparatus according to one embodiment of the present invention. In FIG. 3, an antenna 301 is capable of being extended to increase its length for use or collapsed for storage when not in use. Such an antenna may be selected from among those known in the art as telescoping antennas. When antenna 301 is extended, the output of a power amplifier (PA) 302 is connected to antenna 301 by a switching circuit 303. Control and speech signals to be transmitted are provided from signal source circuit 304 in the form of radio frequency (RF) signals and are radiated from antenna 301 after being amplified by PA 302. A portion of the output signal from PA 302 is coupled to an automatic power control circuit (APC) 305 as a feed back signal. Also, switching circuit 303 sends a detection signal (an on state signal) indicative of the extension of antenna 301 to APC 305 via a control circuit 306. Responsive to the detection signal, APC 305 controls PA 302 so that the amplification factor of PA 302 is variable in response to a level control signal. PA 302 changes it's amplification factor in response to the level of the control signal provided from APC 305. The level control signal is transmitted from a base station and is received by a radio reception circuit 314 and is provided to APC 305 via control circuit 306.

Figure 4:
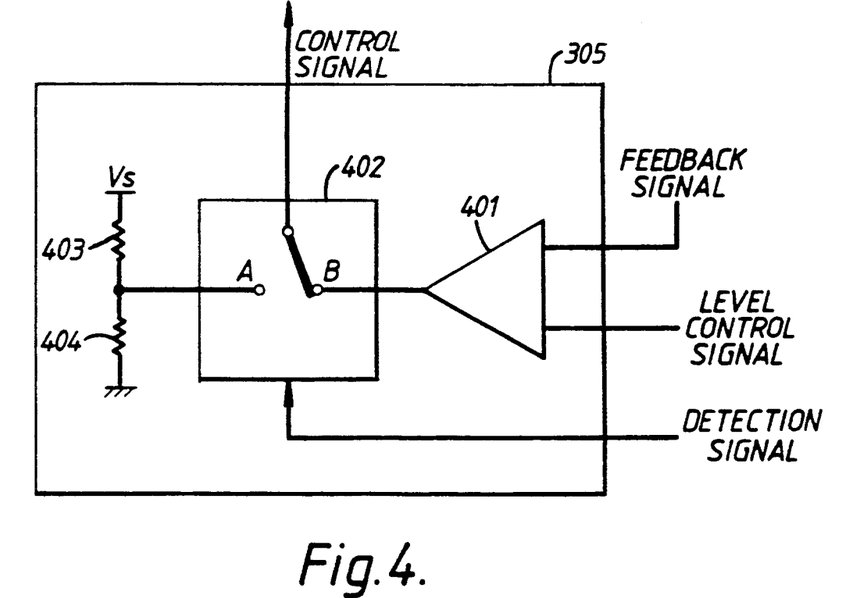
FIG. 4 is a schematic diagram of automatic power control circuit 305 shown in FIG. 3.

FIG. 4 is a schematic diagram of APC 305. The level control signal is compared to the feedback signal by a comparator circuit 401. When antenna 301 is extended, switching circuit 402 switches to the B position so that the output of comparator circuit 401 is applied to PA 302 as the control signal.

Thus, by extending antenna 301, portable unit 300 is able to transmit an RF signal without the adaptor unit which has a magnitude responsive to the level control signal. It should be noted that the switching operation in switching circuit 303 (FIG. 3) and switching circuit 402 (FIG. 4) depends on the extension of antenna 301 provided at portable unit 300, not on the connection between portable unit 300 and adaptor unit 307. Therefore, it is not necessary in this invention to detect a connection between portable unit 300 and adaptor unit 307. Thus, circuitry for detecting the connected relationship is not needed.

Referring to FIG. 3 again, when antenna 301 is collapsed, the output of PA 302 is coupled to an output terminal 308. Output terminal 308 is coupled to an input terminal 309 which is connectd to power amplifier (PA) 310 of adaptor unit 307 through coaxial cable 311. Accordingly, the output signals from PA 302 are applied to the input of PA 310. The applied signals are radiated from antenna 312 after being amplified by PA 310. A portion of the output signal from PA 310 is supplied to an automatic power control circuit (APC) 313 as a feedback signal. Also, switching circuit 303 sends a detection signal (an off state signal) indicative of the collapsed state of antenna 301 to APC 305 via control circuit 306. Responsive to the detection signal, APC 305 controls PA 302 so that the amplification factor of PA 302 is fixed to a predetermined level.

Referring to FIG. 4 again, responsive to the detecting signal (an off state signal), switching circuit 402 changes to the a position so that a predetermined voltage level, which is provided from a power supply voltage Vs divided by resistors 403 and 404, is applied to PA 302. The amplification factor of PA 302 is thus fixed to a predetermined level. The level is set at a predetermined level so that PA 310 in adaptor unit 7 is appropriately driven.

The level control signal provided from control circuit 306 also is applied to APC 313. In APC 313, the level control signal is compared with the feed back signal from the output of PA 310 by a comparator circuit 314. An output of comparator circuit 314 is applied to PA 310.

Thus, by collapsing antenna 301, an RF signal is amplified at a predetermined amplification level in portable unit 300. The amplified RF signal is coupled to adaptor unit 307 and further amplified by an amplification factor responsive to the level control signal in adaptor unit 307.

Figure 5:
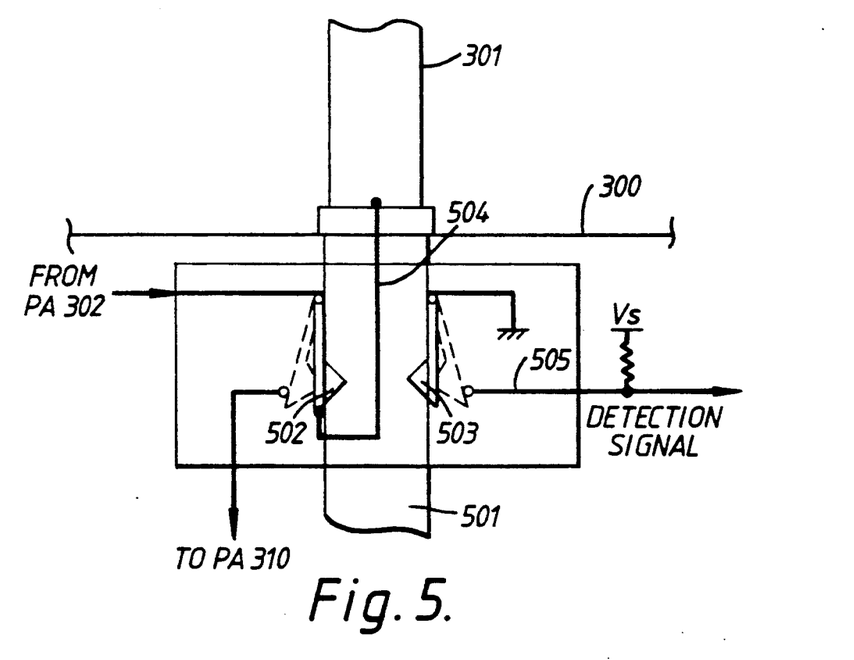
FIG. 5 is a structural diagram of switching circuit 303 shown in FIG. 3.

FIG. 5 is a structural diagram of switching circuit 303 shown in FIG. 3. A hole 501 is provided in portable unit 300 to accommodate antenna 301. At a side wall of hole 501, two switch elements 502 and 503 are provided so as to be pushed aside when antenna 301 is accommodated in hole 501. One end of switch element 502 is connected to the output of PA 302. A line 504 is connected from antenna 301 on one end of switch element 502 when antenna 301 is extended. When antenna 301 is accommodated in hole 501, switch element 502 is pushed aside and then the other end of switch element 502 is connected to the input of PA 310. Switch element 503 is used for generating the detection signal indicative of the state of antenna 301.

If antenna 301 is extended, the detection signal is maintained at a high logic level since signal line 505 is pulled to a high voltage level by power supply voltage Vs since it is not in contact with switch element 503. If antenna 301 is accommodated in hole 501, the detection signal is maintained at a low level since signal line 505 contacts one end of switch element 503 and the other end of switch element 503 is connected to ground.

Figure 6:
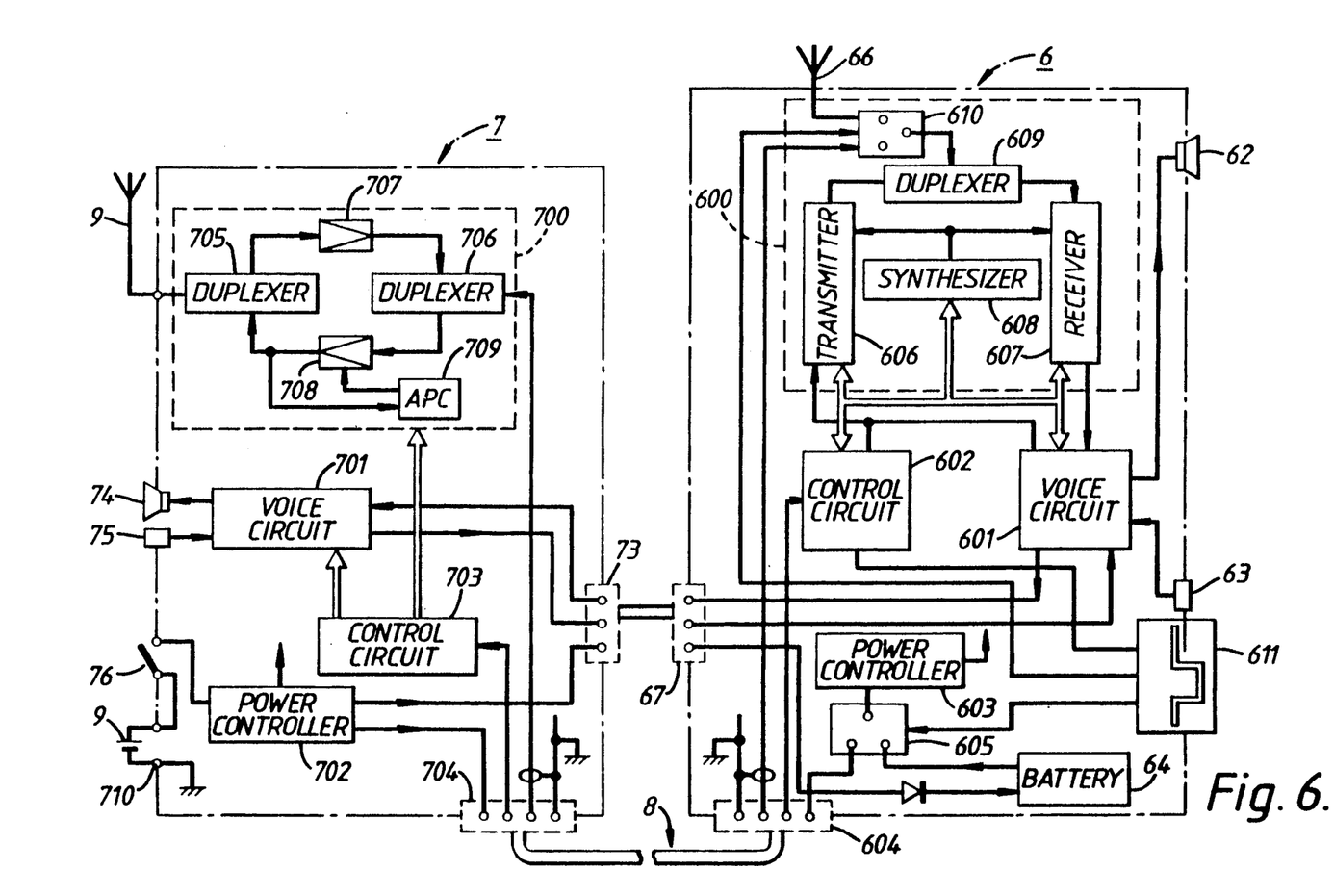
FIG. 6 is a block diagram of a mobile telephone in accordance with another embodiment of the present invention.

Another embodiment of the present invention relating to a mobile telephone includes a portable unit and an adaptor unit will be described. FIG. 6 is a block diagram showing the arrangement of the mobile telephone according to this embodiment.

A portable unit 6 comprises an antenna 66, a duplexer 609, a receiver 607, a transmitter 606, a synthesizer 608, a voice circuit 601, a control circuit 602, a power controller 603, a battery 64, a speaker 62, a microphone 63, switch circuits 605, 610, and 611, a connection terminal 67 and a cable connector 604.

An adaptor unit 7 comprises a booster unit 700, a voice circuit 701, a power controller 702, a control circuit 703, an antenna 9, a loudspeaker 74, a microphone 75, a power switch 76, a connection terminal 73, a cable connector 704, and a battery connector 710. Booster unit 700 comprises duplexers 705 and 706, a reception amplifier 707, a transmission power amplifier 708, and an automatic power control circuit (APC) 709. A car battery 9 is connected to battery connector 710.

Portable unit 6 is connected to adaptor unit 7 via a coaxial cable 8 connected to cable connectors 604 and 704. Also, portable unit 6 is directly connected to adaptor unit 7 through connection terminals 67 and 73.

Figure 7A:
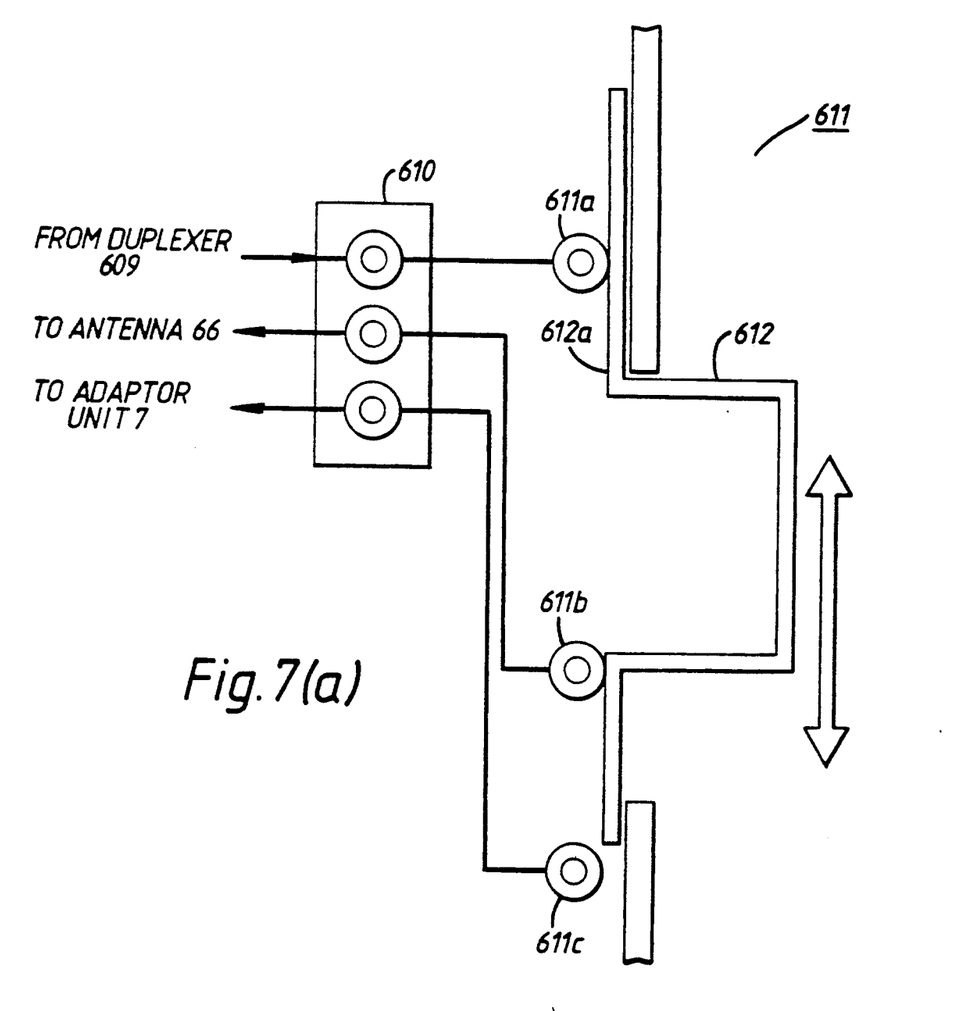
FIGS. 7(a) and (b) are structural diagrams of switch circuit 611 shown in FIG. 6.
Figure 7B:
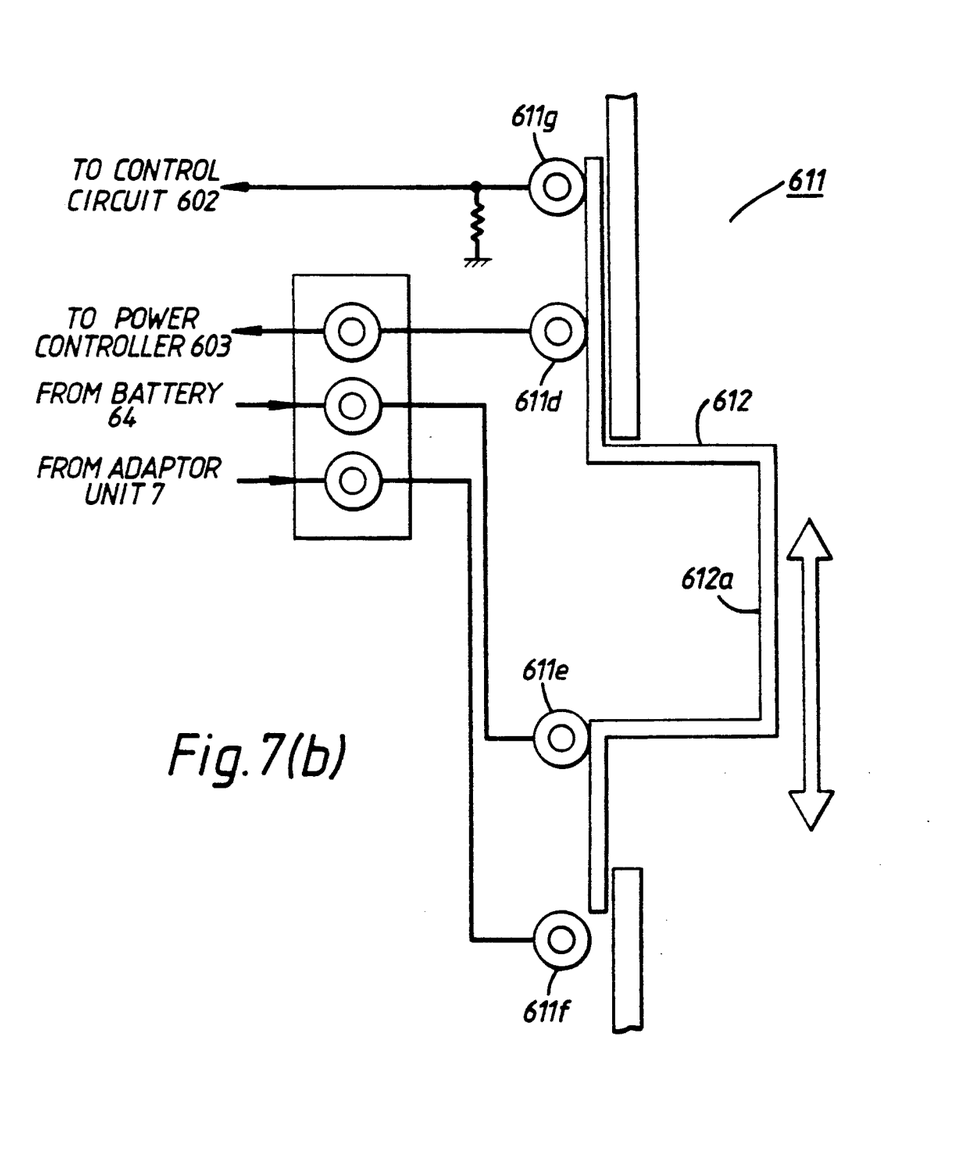

FIG. 7(a) and FIG. 7(b) are structural diagrams of switch circuit 611 in portable unit 6. Referring to FIG. 7(a), a strip line is provided at an inside surface 612a of switch 612. A terminal 611a is connected to duplexer 609. A terminal 611b is connected to antenna 6b. A terminal 611c is connected to adaptor unit 7 through coaxial cable 8. If switch 612 is moved to the high position in FIG. 7(a), terminal 611a is connected to terminal 611b through the strip line. Accordingly, duplexer 609 is coupled to antenna 66. If switch 612 is moved to the low position in FIG. 7(a), terminal 611a is connected to terminal 611c through the strip line. Accordingly, duplexer 609 is coupled to duplexer 706 in adaptor unit 7 through coaxial cable 8. The transmission line between antenna 66 and duplexer 609, or between duplexer 706 and duplexer 609, is formed of a strip line and a metalic line for transmitting RF signals.

Likewise, referring to FIG. 7(b), a lead line is provided at an inside surface 612a of switch 612. A terminal 611d is connected to power controller 603. A terminal 611e is connected from battery 64. A terminal 611f is connected from adaptor unit 7 through coaxial cable 8. If switch 612 is moved to the high position in FIG. 7(b), terminal 611d is connected to terminal 611e through the lead line. Accordingly, power controller 603 is connected to battery 64. If switch 612 is moved to the low position in FIG. 7(b), terminal 611d is connected to terminal 611f through the lead line. Accordingly, power controller 603 is connected to power controller 702 in adaptor unit 7 through coaxial cable 8. Also, terminal 611g is provided at the end of switch 612. Terminal 611g is connected from control circuit 602 as an input for the detection signal. Since power controller 603 is supplied power from battery 74, or power controller 702 in adaptor unit 7, the voltage level of the lead line of switch 612 is in an on state. Therefore, if switch 612 is moved to the high position in FIG. 7(b), the voltage of switch 612 is applied to terminal 611g and the input to control circuit 602 becomes on state. Conversely, if switches 612 is moved to the low position, the input to control circuit 602 becomes an off state.

Figure 8:
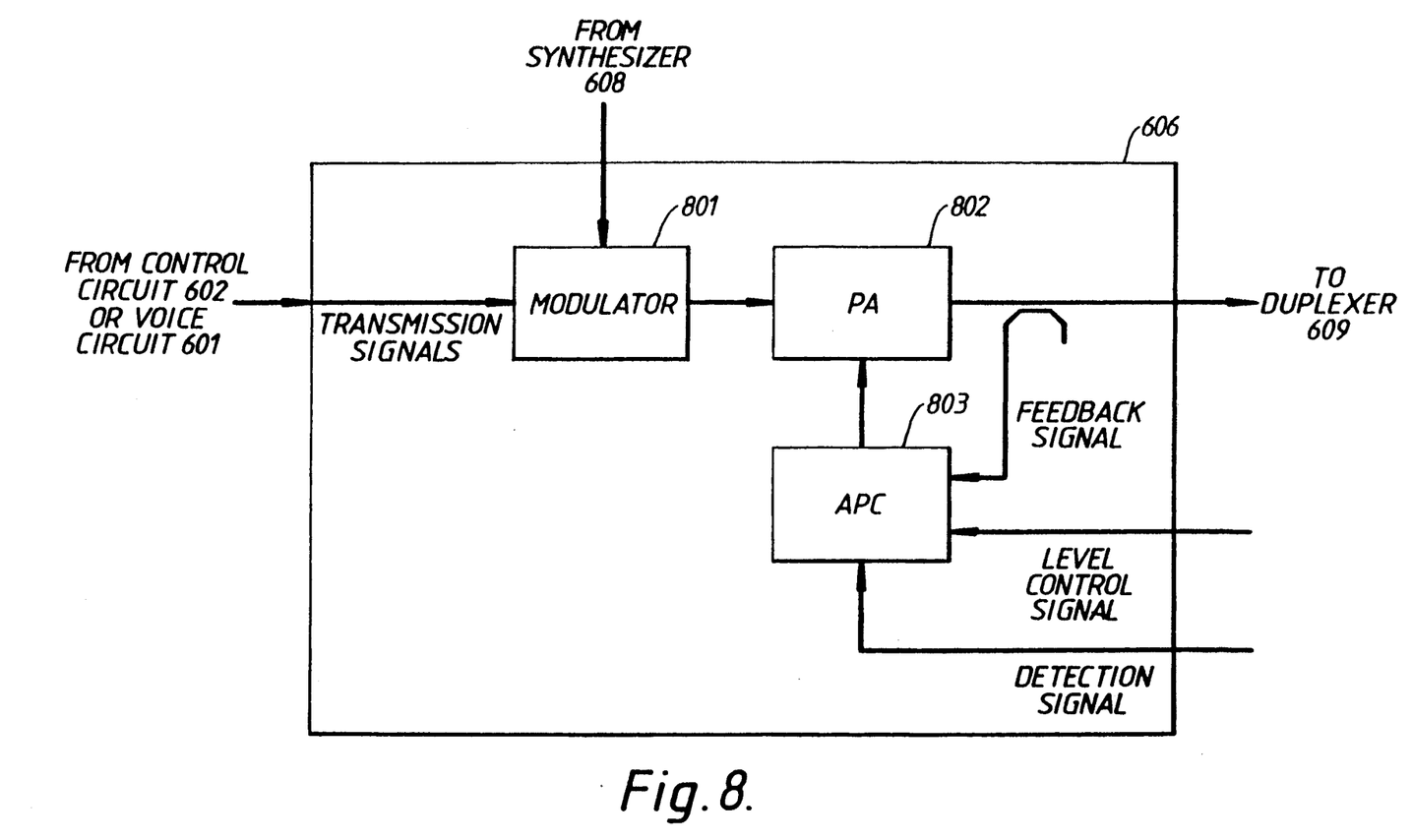
FIG. 8 is a block diagram of transmitter 606 shown in FIG. 6.

FIG. 8 is a block diagram of transmitter 606 shown in FIG. 6. Control signals from control circuit 602, or speech signals from voice circuit 601, are applied to a modulator 801. Modulator 801 modulates the applied signals on the basis of a modulation frequency signal provided from synthesizer 608. The modulated signals are applied to power amplifier (PA) 802. PA 802 amplifies the applied signals at an amplification factor provided from an automatic power control circuit (APC) 803. APC 803 has the same arrangement of APC 305 shown in FIG. 4. APC 803 provides an amplification factor to PA 802 in response to a feedback signal, a level control signal, and the detection signal from switch circuit 611. The amplified signals are applied to duplexer 609.

When switch 612 is moved to the high position in FIG. 7(a) and FIG. 7(b), power controller 603 is supplied power from battery 64 and duplexer 609 is coupled to antenna 66. Also, control circuit 602 receives the detection signal (an on state signal) from switch 611. Responsive to the detection signal, control circuit 602 sends a control signal to switch circuit 402 (FIG. 4) of APC 803 so that the output of comparator 401 (FIG. 4) is applied to PA 802 as an amplification factor. Accordingly, each section of portable unit 6 is supplied power from battery 64 via power controller 603. When the transmission signals provided from control circuit 602, or voice circuit 601, are applied to transmitter 606, these signals are amplified by PA 802 of transmitter 606 at an amplification factor responsive to the level control signal and the feedback signal. The amplified signals are applied to duplexer 609 and radiated from antenna 66.

When switch 612 remains in the low position in FIG. 7(a) and FIG. 7(b), if power switch 76 of adaptor unit 7 is closed, power controller 603 is supplied power from the car battery via power controller 702 through coaxial cable 8. Duplexer 609 is coupled to duplexer 706 through coaxial cable 8. Also, control circuit 602 receives the detection signal (an off state signal) from switch circuit 611. Responsive to the detection signal, control circuit 602 sends a control signal to switch circuit 402 (FIG. 4) of APC 803 so that a fixed voltage divided by resistors 403 and 404 is applied to PA 802 as an amplification factor. Also, control circuit 602 provides a level control signal to APC 709 in adaptor unit 7 through coaxial cable 8. Accordingly, each section of both portable unit 6 and adaptor unit 7 is supplied power from car battery 9 via power controller 603 and 702. When the transmission signals provided from control circuit 602, or voice circuit 601, are applied to transmitter 606, these signals are amplified in PA 802 of transmitter 606 at an amplification factor responsive to the fixed voltage. The amplified signals are coupled to duplexer 706 via coaxial cable 8 and applied to PA 708. APC 709 compares the level control signal with a feedback signal from the output of PA 708 and provides an output signal from the comparison to PA 708 as an amplification factor. So, the signals applied to PA 708 is amplified at an amplification factor responsive to the level control signal and the feedback signal. The signals amplified by PA 708 are applied to duplexer 609 and radiated from antenna 66.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to included any such embodiments as may be encompassed within the scope of the claims appended hereto.

We claim:

1. A radio telephone apparatus comprising a portable unit, an adaptor unit mounted in a vehicle and connectable to the portable unit through a cable, and a vehicle antenna provided on the vehicle, wherein:

the portable unit includes:
a signal source for generating transmission signals to be transmitted;
modulator means connected to the signal source for modulating the transmission signals generated by the signal source;
first amplifying means connected to the modulator means for amplifying the transmission signals modulated by the modulator means on the basis of a first amplification factor;
first control means for providing the first amplification factor;
a portable antenna for receiving and transmitting radio frequency signals;
first terminal connected to the portable antenna;
second terminal connected to a connector of the portable unit;
third terminal;
first duplexer means connected to the third terminal and the first amplifying means for applying the transmission signals amplified by the first amplifying means to the third terminal and for receiving reception signals from the third terminal and providing the reception signals to a reception terminal of the first duplexer means;
receiver means connected to the reception terminal of the first duplexer means for receiving the reception signals from the first duplexer means; and
switching means for selectively connecting the third terminal to either one of the first terminal or the second terminal;

the adaptor unit includes:
second duplexer means connected to a connector of the adaptor unit for receiving transmission signals from the connector of the adaptor unit and for applying reception signals to the connector of the adaptor unit;
second amplifying means connected to the second duplexer means for amplifying the transmission signals from the second duplexer means on the basis of a second amplification factor;
second control means coupled to the output of the second amplifying means for providing the second amplification factor in response to the output signal level of the second amplifying means and a level control signal; and
third duplexer means connected to the second duplexer, the vehicle antenna, and the output of the second amplifying means for applying the reception signals from the vehicle antenna to the second duplexer means and applying the transmission signals amplified by the second amplifying means to the vehicle antenna; and the cable includes:

a unique signal line coupled to the connectors of both of the portable unit and the adaptor unit for transmitting the transmission and reception signals.

2. The radio telephone apparatus of claim 1 wherein the first control means provides the first amplification factor in response to the output signal level of the first amplifying means and a level control signal when the switching means connects the third terminal to the first terminal.

3. The radio telephone apparatus of claim 1 wherein the first control means provides the first amplification factor which is fixed to a predetermined value when the switching means connects the third terminal to the second terminal.

4. The radio telephone apparatus of claim 1 wherein the switching means connects the third terminal to the second terminal when the connector of the portable unit is connected with the connector of the adaptor unit through the cable.

5. The radio telephone apparatus of claim 1 wherein the switching means connects the third terminal to the first terminal when the connector of the portable unit is not connected with the connector of the adaptor unit.

6. The radio telephone apparatus of claim 1 wherein the portable unit comprises a first battery and the portable unit is supplied power with the first battery when the connector of the portable unit is not connected with the connector of the adaptor unit and wherein the portable unit and the adaptor unit are supplied power with a second battery mounted in the vehicle when the connector of the portable unit is connected with the connector of the adaptor unit through a power supplied line in the cable.

7. The radio telephone apparatus of claim 6 wherein the first battery is a rechargeable battery and the first battery is charged by the second battery when the connector of the portable unit is connected with the connector of the adaptor unit through the power supply line.

8. A radio telephone apparatus comprising a portable unit, an adaptor unit connectable to the portable unit through a cable, and a first antenna associated with the adaptor unit, wherein:

the portable unit includes:

a signal source for generating transmission signals to be transmitted;

modulator means connected to the signal source for modulating the transmission signals generated by the signal source;

first amplifying means connected to the modulator means for amplifying the transmission signals modulated by the modulator means on the basis of a first amplification factor;

first control means for providing the first amplification factor;

second antenna for receiving and transmitting radio frequency signals;

first terminal connected to the second antenna;

second terminal connected to a connector of the portable unit;

third terminal;

first duplexer means connected to the third terminal and the first amplifying means for applying the transmission signals amplified by the first amplifying means to the third terminal and for receiving reception signals from the third terminal and providing the reception signals to a reception terminal of the first duplexer means;

receiver means connected to the reception terminal of the first duplexer means for receiving the reception signals from the first duplexer means; and switching means for selectively connecting the third terminal to either one of the first terminal or the second terminal;

the adaptor unit includes:

second duplexer means connected to a connector of the adaptor unit for receiving transmission signals from the connector of the adaptor unit and for applying reception signals to the connector of the adaptor unit;

second amplifying means connected to the second duplexer means for amplifying the transmission signals from the second duplexer means on the basis of a second amplification factor;

second control means coupled to the output of the second amplifying means for providing the second amplification factor in response to the output signal level of the second amplifying means and a level control signal; and third duplexer means connected to the second duplexer, the vehicle antenna, and the output of the second amplifying means for applying the reception signals from the first antenna to the second duplexer means and applying the transmission signals amplified by the second amplifying means to the vehicle antenna; and the cable includes:

a unique signal line coupled to the connectors of both of the portable unit and the adaptor unit for transmitting the transmission and reception signals.

9. The radio telephone apparatus of claim 8 wherein the first control means provides the first amplification factor in response to the output signal level of the first amplifying means and a level control signal when the switching means connects the third terminal to the first terminal.

10. The radio telephone apparatus of claim 8 wherein the first control means provides the first amplification factor which is fixed to a predetermined value when the switching means connects the third terminal to the second terminal.

11. The radio telephone apparatus of claim 8 wherein the switching means connects the third terminal to the second terminal when the connector of the portable unit is connected with the connector of the adaptor unit through the cable.

12. The radio telephone apparatus of claim 8 wherein the switching means connects the third terminal to the first terminal when the connector of the portable unit is not connected with the connector of the adaptor unit.

13. The radio telephone apparatus of claim 8 wherein the portable unit comprises a first battery and the portable unit is supplied power with the first battery when the connector of the portable unit is not connected with the connector of the adaptor unit and wherein the portable unit and the adaptor unit are supplied power with a second battery, which output voltage is higher than that of the first battery, when the connector of the portable unit is connected with the connector of the adaptor unit through a power supplied line in the cable.

14. The radio telephone apparatus of claim 13 wherein the first battery is a rechargeable battery and the first battery is charged by the second battery when the connector of the portable unit is connected with the connector of the adaptor unit through the power supply line.

* * * * *